March 20, 1945.   R. A. BRODING   2,372,056
METHOD AND APPARATUS FOR RECORDING SEISMIC WAVES
Filed June 21, 1941
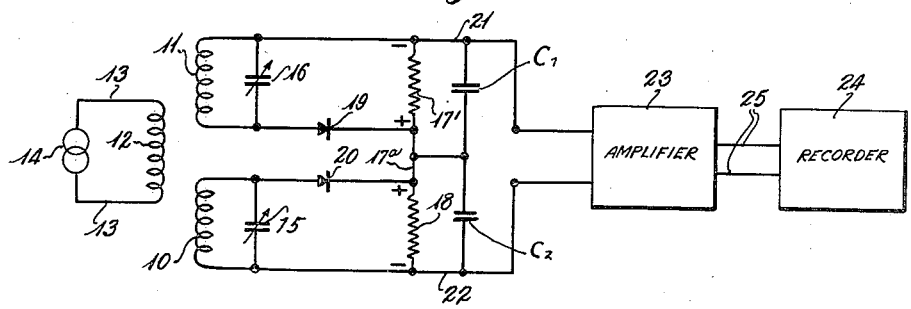
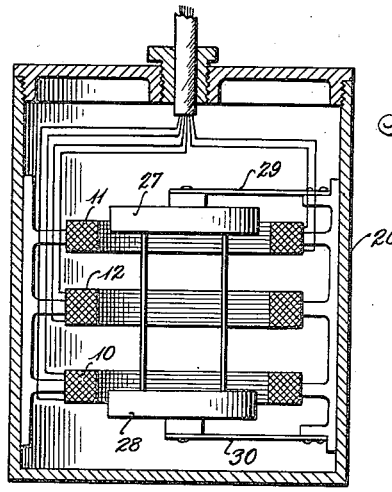
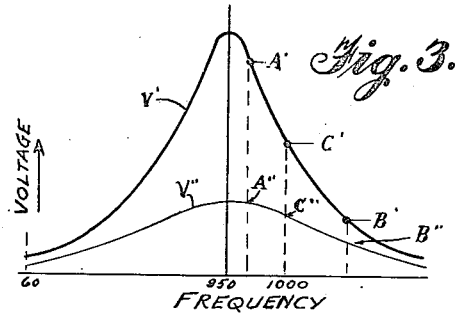
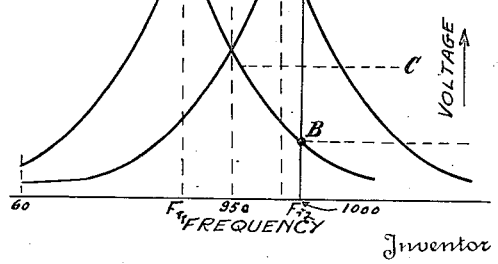
Inventor
Robert A. Broding
By Dallas R. Lamont
Attorney Patented Mar. 20, 1945

2,372,056

UNITED STATES PATENT OFFICE 2,372,056

METHOD AND APPARATUS FOR RECORDING SEISMIC WAVES

Robert A. Broding, Dallas, Tex., assignor to Socony-Vacuum Oil Company, Incorporated, New York, N. Y., a corporation of New York Application June 21, 1941, Serial No. 399,170

9 Claims. (Cl. 177—352)

This invention relates generally to a method and apparatus for recording seismic waves and more particularly to a system in which a suitable carrier wave of constant frequency is modulated by signal frequencies corresponding to seismic waves.

Electric seismographs have long been used and many types have been devised for the purpose of geophysical exploration but due to the fact that in recording seismic waves, one is confronted with the problem of detecting, amplifying and recording relatively low frequency signals, the fineness of control desired has not heretofore been attained. Among the common faults in the known systems are lack of sensitivity, and inability to eliminate spurious voltages induced in the system, such as those resulting from high-line "pick-up."

In order to overcome the above enumerated objectionable features, the instant invention is directed to a system which employs a relatively high frequency, for example 1000 cycles per second or higher, as a carrier wave to be modulated by the seismic waves, detected and recorded by an appropriate camera.

This invention contemplates a method and system that uses a reactance type geophone, two of whose coils serve as inductance elements in a resonant circuit, an oscillator, amplifier and recorder.

Another object of this invention resides in the provision of a method of recording seismic waves by modulating in a novel manner a relatively high frequency carrier wave with a signal that corresponds to the seismic waves, eliminating the carrier wave and recording signals that correspond to the seismic waves.

Still another object of this invention resides in the provision of means for detecting seismic waves; the sensitivity of said means can be increased to any desired degree.

Many further advantages and details of this invention will be apparent from the following description of the preferred embodiment thereof. It is to be understood it is intended herein to cover not only the combination of the features herein disclosed, but also to cover separately each of the features herein disclosed insofar as those features are patentable.

In the drawing:

Figure 1 shows a circuit diagram of an electric seismograph according to the instant invention;

Figure 2 is a diagrammatic illustration of a geophone of the type used in the instant invention to detect the seismic waves;

Figure 3 shows a single resonant curve of an inductance-capacity circuit; and

Figure 4 shows two resonant curves illustrating the manner in which the frequency response of the geophone changes with displacement.

Referring to the drawing in detail, particularly Figures 1 and 2, there are shown three stationary coils 10, 11, and 12, all of which are disposed within the geophone case 26. Coil 12 by means of the conductors 13, is connected to an oscillator 14. Oscillator 14 impresses across the coil 12 a carrier wave of relatively high constant frequency. Coils 10 and 11 are inductively coupled to coil 12. Connected in parallel with coils 10 and 11 are variable condensers 15 and 16 respectively by means of which the circuits including the coils 10 and 11 can be tuned to a frequency slightly different than the carrier wave. Connected in parallel with coil 11 and condenser 16 is a load resistance 17'. In like manner, load resistance 18 is connected in parallel with the condenser 15 and coil 10. Load resistances 17' and 18 have adjacent ends connected together by means of a conductor 17a. Half wave rectifiers 19 and 20 are connected in series in each circuit with such polarity as to cause the voltage impressed across the input of an amplifier 23 by conductors 21 and 22 to be the difference of the two rectified voltages. Output conductors 21 and 22 are connected to the outer ends of the resistances 17' and 18. Filtering condensers $C_1$ and $C_2$ are connected across load resistances 17' and 18 respectively, in order to shunt out the high frequency carrier wave after demodulation by rectifiers 19 and 20. The output of the amplifier is passed on to the recorder 24 by means of the conductors 25.

As shown in Figure 2, the coils 10, 11 and 12 are fixed to the case 26 of the geophone. Cores 27 and 28 for the coils 10 and 11 are resiliently mounted within the case by means of leaf springs 29 and 30 and serve as an inertia assembly, which on movement of the case will tend to remain stationary; that is, movement of the case 26 will produce relative movement between the cores 27 and 28 and the fixed coils 10 and 11. The cores 27 and 28 are so connected and arranged relative to the coils 10 and 11 that as one coil increases in inductance, the other decreases. This action is made use of in the circuit which is sensitive to resonant changes of the two tuned inductance-capacity circuits. As the inductance of these two coils changes oppositely the resonant points of these two circuits change in a reversed manner and there results an output voltage across the leads 21 and 22 that appears as the geophone frequency. The carrier wave is eliminated by an electrical action in many respects similar to operation of a discriminator. Thus, at the resting frequency, or without modulation of the carrier, the rectified currents flowing in the resistances 17 and 18 produce equal and opposite voltages across them. Hence their algebraic sum is zero. The condensers C1 and C2 by their filtering action, insure that the foregoing addition of the voltages takes place even though the rectifiers 19 and 20 respectively conduct current on the negative and positive half cycles of the applied signals.

Assume the Q, that is, the ratio of the effective reactance to the resistance, of the coils 10 and 11 to be such that in the rest position and tuned with the condensers 16 and 15, a resonant curve as shown in Figure 3 will be obtained. In the Figure 3, the resonant frequency is illustrated as occurring at 950 cycles. In the practice of the invention a carrier frequency, say 1000 cycles, is chosen sufficiently removed from the resonant frequency, either in one direction or the other, to permit variations in the magnitude of the voltage output to take place about some middle point such as C' as in Figure 3, when vibration of the geophone takes place due to seismic vibrations of the earth.

If the Q of the coil is sufficiently high, that portion of the curve between arbitrarily chosen points A' and B' will be nearly linear about point C'. It is obvious, however, that the points A' and B' cannot be chosen too remotely from a middle point C'. Let the frequency of the carrier wave as controlled by the oscillator be chosen such that its frequency will correspond to the middle point C' of curve V', for instance 1000 cycles. Since all the circuit elements are identical in the rest position, the resonant curves of the two inductance capacity circuits shown in Figure 1 should be identical and similar to the curve V'. Therefore, in the rest position both circuits 11—16 and 10—15 in Figure 1 must have identical voltages and of a value corresponding to the point C' in Figure 3. From the circuit shown in Figure 1, it can be seen that the rectified output voltage across the leads 21 and 22 is the rectified voltage difference between a voltage induced in coil 11 and that induced in the coil 10, because the two separate rectifiers are connected in series opposing. Then with a fixed carrier wave, for example of 1000 cycles per second, the geophone at rest, it is clear that the voltage output across the leads 21 and 22 will be zero, and that the two voltages generated in coils 10 and 11 will be equal and will correspond to that voltage as represented by C' in Figure 3. Therefore, in the rest position there is no output voltage across the input terminals of the amplifier 23.

Now let the vibrations be such as to cause the inductance of the coil 11 to decrease and the inductance of coil 10 to increase. This will shift the resonant curves of the two circuits in the manner disclosed in Figure 4. The inductance-capacity circuit comprising the coil 11 and the condenser 16 now has its resonant frequency nearly equal to carrier frequency, raising its voltage corresponding to the point A in Figure 4; while the inductance-capacity circuit comprising coil 10 and the condenser 15 moves farther away from the carrier frequency and reducing its voltage corresponding to the point B. The two arrows at the top of the vertical line at 950 cycles indicate graphically the two directions in which the resonant curves are displaced. The rectified output voltage representing the seismic waves will be the difference of the two voltages corresponding to the points A and B in Figure 4. Similarly, the reverse holds true when the inductance of coil 11 increases and that of coil 10 decreases in which case the output voltage reverses itself in polarity.

In curve V" as shown in Figure 3, there is illustrated the resonant curve for the resonant circuits 11—16 and 10—15 where the Q of the coils will be substantially smaller than previously assumed. In this case the voltage output corresponding to the difference of the voltages at A" and B" in Figure 3, would be very substantially less for the case where the Q is very much larger, as shown by the curve V'.

In the practice of this invention, the output voltage for a given vibration can be greatly increased by use of coils having very high Q's at the frequencies corresponding to the carrier frequency. The use of the high Q coils also makes it possible to have sharply resonant circuits and to operate over a wide portion of the resonant curves; corresponding to A'—B', and at the same time having this portion of the curve essentially a straight line and thus avoiding a second harmonic distortion. It is obvious that if the Q of the two coils 10 and 11 were very high, the resonant curve corresponding to V' in Figure 3 would be very sharp and the sensitivity of the geophone would be greatly enhanced.

It has been stated that the sensitivity of the circuit shown in Figure 1 can be greatly increased by increasing the voltage output of the oscillator 14. In the rest position of the geophone or as the geophone vibrates through its mid position, the voltage output is zero, and this voltage output becomes a maximum in the maximum positions of the vibrations of the geophone case 26, carrying with it the coils 10 and 11, while the inertia elements 28 and 27 remain substantially fixed. The voltages induced in coils 10 and 11 are obviously linear functions of the voltage across the oscillator coil 12. By increasing the oscillator voltage, these two induced voltages in the coils 10 and 11 can be increased at will. In this way, the sensitivity of this type of geophone can be greatly increased, corresponding to the maximum positions of the vibrations of the geophone case and attached coils 10 and 11.

A sensitivity control such as here described cannot be obtained with the usual various types of variable reluctance geophones and also cannot be made use of in the dynamic types of geophones. The control described is characteristic of the reactance type of geophone, either in a bridge circuit or in the resonant circuits as here described.

Thus it can be seen that the geophone operates over a rather steep portion of the curve between points A' and B'. By making the Q of the geophone coils high, the steepness of the resonance circuits can be raised. Using such a system the output will be much greater than can be realized with any of the systems known heretofore.

I claim:

1. A method of detecting and recording seismic waves that comprises generating an electrical carrier current wave of a frequency higher than that of the seismic waves to be detected, producing modulated carrier waves in two resonance circuits that are tuned to a common frequency that is slightly different from the carrier current frequency by varying the tuning of the two circuits such that one circuit approaches resonance while the other departs further from it, individually rectifying said modulated carrier waves by half wave rectifiers which pass different half waves in the two circuits, electrically adding the difference of the rectified signals, eliminating the carrier wave by filtering, and amplifying and recording the resultant signal.

2. A method of detecting and recording seismic waves that comprises generating an electrical field by a carrier current wave of a frequency higher than that of the seismic waves to be detected, modulating the induced carrier current wave in accordance with said seismic waves by changing the induced voltages in the coils of two resonance circuits by changing the inductance in each coil such that one circuit approaches resonance while the other departs further from it, rectifying the induced voltages by half wave rectifiers which pass different half waves in the two circuits, algebraically adding the rectified voltages, filtering out the carrier, and amplifying and recording the resultant signal.

3. A method of detecting and recording seismic waves that comprises generating an electrical carrier current wave of a frequency higher than that of the seismic waves to be detected, modulating said carrier wave in accordance with said seismic waves by varying the tuned resonance of two circuits such that one circuit approaches resonance while the other departs further from it, rectifying the voltages induced in the two circuits by half wave rectifiers which pass different half waves in the two circuits, adding algebraically the two rectified voltages, eliminating the carrier wave, and amplifying and recording the resultant signal.

4. A method of detecting seismic waves which comprises generating an electrical field by a carrier current of a frequency higher than that of the seismic waves to be detected, modulating the induced carrier currents in each of two circuits, whose resonant frequency is slightly different from that of the carrier current, coupled to the carrier field by varying the inductance oppositely in each of said circuits, whereby the resonant frequency of one circuit approaches that of the carrier frequency while the other departs therefrom, rectifying the induced voltages in each resonant circuit by separate half wave rectifiers, filtering each rectified output voltage to filter out the carrier currents, algebraically adding the rectified voltages, and amplifying and recording the resulting signal.

5. A method of detecting seismic waves that comprises generating an electrical field by a carrier current of a frequency higher than that of the seismic waves to be detected, modulating the induced carrier currents in each of two circuits, whose resonant frequency is slightly different from that of the carrier current, coupled to the carrier field by varying the induced voltages in coils in the said circuits coupled to the carrier field by changing the inductance of each coil in an opposite direction, whereby the resonant frequency of one circuit approaches that of the carrier frequency while the other departs therefrom, rectifying the induced voltages in each resonant circuit by separate half wave rectifiers, filtering each rectified output to filter out the carrier currents, algebraically adding the rectified voltages, and amplifying and recording the resulting signal.

6. A method of detecting seismic waves that comprises generating an electrical field by a carrier current of a frequency higher than that of the seismic waves to be detected, modulating the induced carrier currents in each of two circuits, whose resonant frequency is slightly below that of the carrier current, coupled to the carrier field by varying the induced voltages in coils in the said circuits coupled to the carrier field by changing the inductance of each coil in an opposite direction, whereby the resonant frequency of one circuit approaches that of the carrier frequency while the other departs therefrom, rectifying the induced voltages in each resonant circuit by separate half wave rectifiers, algebraically adding the rectified voltages, and amplifying and recording the resulting signal.

7. In a system in which a carrier current of a selected frequency is applied to an input circuit which includes two branches, each tuned by impedance elements to a resonant frequency differing somewhat from said selected frequency, each said branch including a rectifier and a resistance across each of which there is developed a direct current potential difference, and an output circuit to which there is applied the algebraic sum of said potential differences, the method of producing electrical signals representative of seismic waves which comprises utilizing said seismic waves simultaneously to change the impedance of each of said branches to tune one of them towards resonance at said carrier frequency and to detune the other away from resonance at said carrier frequency thereby to increase one and to decrease the other of said potential differences by amounts related to the steepness of the resonant characteristic curve of each of said branch circuits for the development in said output circuit of a resultant voltage wave comprising the carrier and positive and negative half cycles whose amplitudes are magnified representations of said seismic waves, filtering out the carrier, and recording the resultant signal.

8. The combination as set forth in claim 7, in which each branch circuit has a high ratio of reactance to resistance and a resonant characteristic curve of steep slope on each side of resonance, and in which, in the absence of seismic waves each branch circuit functions about midway of the region of said steep slope of its resonant characteristic curve.

9. In a system in which a carrier current of a selected frequency is applied to an input circuit which includes two branches each having impedance elements by means of which each circuit may be tuned, each said branch including a rectifier and a resistance across which there is developed a direct current potential difference, and an output circuit, the method of detecting minute physical changes which comprises tuning each of said branches to a resonant frequency differing somewhat from said selected frequency, utilizing said physical changes simultaneously to tune one of said branches toward resonance at said carrier frequency and to detune the other of said branches further from resonance at said carrier frequency thereby to change said potential differences in opposite directions and by amounts related to the resonant characteristic of each of said branch circuits, and applying the algebraic sum of said potential differences to said output circuit for the development in said output circuit of a resultant voltage which is at all times a magnified representation of said physical changes.

ROBERT A. BRODING.